United States Patent
Paik et al.

(10) Patent No.: US 8,165,229 B2
(45) Date of Patent: Apr. 24, 2012

(54) CHANNEL ESTIMATION METHOD AND APPARATUS IN ORTHOGONAL FREQUENCY DIVISION MULTIPLEXING SYSTEM

(75) Inventors: Kyung-Hyun Paik, Hwaseong-si (KR); Hee-Jin Roh, Suwon-si (KR)

(73) Assignee: Qualcomm Incorporated, San Diego, CA (US)

( * ) Notice: Subject to any disclaimer, the term of this patent is extended or adjusted under 35 U.S.C. 154(b) by 808 days.

(21) Appl. No.: 11/942,288

(22) Filed: Nov. 19, 2007

(65) Prior Publication Data

US 2008/0123758 A1 May 29, 2008

(30) Foreign Application Priority Data

Nov. 17, 2006 (KR) .................. 10-2006-0114134

(51) Int. Cl.
*H04K 1/10* (2006.01)
(52) U.S. Cl. ........ 375/260; 375/259; 375/340; 375/346; 375/316; 370/206; 455/39
(58) Field of Classification Search .................. 375/260, 375/259, 340, 346, 150, 254, 316; 370/206; 455/39
See application file for complete search history.

(56) References Cited

U.S. PATENT DOCUMENTS

| 2003/0072254 A1* | 4/2003 | Ma et al. ........................ 370/208 |
| 2004/0184399 A1 | 9/2004 | Chiou |
| 2008/0123758 A1* | 5/2008 | Paik et al. ..................... 375/260 |
| 2009/0213948 A1* | 8/2009 | Ma et al. ....................... 375/260 |

FOREIGN PATENT DOCUMENTS

KR 1020060088334 8/2006

* cited by examiner

*Primary Examiner* — David C. Payne
*Assistant Examiner* — Zewdu Kassa
(74) *Attorney, Agent, or Firm* — Elaine Lo (57) ABSTRACT

Disclosed is a channel estimation method and apparatus in an OFDM system. The method includes performing channel estimation at a pilot position of a received symbol, thereby calculating a first channel estimate, performing diagonal interpolation between the first channel estimate and a channel estimate for another pilot position that is different from the first pilot position, thereby calculating a second channel estimate for a data position, performing time interpolation between the second channel estimate and a channel estimate for another pilot position that is identical to the second pilot position, thereby calculating a third channel estimate for another data position, and performing frequency interpolation by using the channel estimates for the pilot positions and the second and third channel estimates, thereby calculating channel estimates for remaining data positions.

26 Claims, 9 Drawing Sheets

CHANNEL ESTIMATION METHOD AND APPARATUS IN ORTHOGONAL FREQUENCY DIVISION MULTIPLEXING SYSTEM

PRIORITY

This application claims priority to an application entitled "Channel Estimation Method and Apparatus in Orthogonal Frequency Division Multiplexing System" filed in the Korean Industrial Property Office on Nov. 17, 2006 and assigned Serial No. 2006-114134, the contents of which are incorporated herein by reference.

BACKGROUND OF THE INVENTION

1. Field of the Invention

The present invention relates generally to an Orthogonal Frequency Division Multiplexing (OFDM) system, and more particularly to a channel estimation method and apparatus in an OFDM system.

2. Description of the Related Art

Conventional methods for performing channel estimation in an OFDM system include pilot signal-based estimation and use of data decoded in a decision directed scheme. Usually, when coherent demodulation is used in a communication system, a transmitting end transmits pilot signals for channel estimation, and a receiving end for performing the coherent demodulation performs channel estimation based on the received pilot signals.

In a conventional OFDM system, a scheme for arranging pilots on the frequency-time plane may be classified into such schemes as a comb-type pilot arrangement and a lattice-type pilot arrangement.

The comb-type pilot arrangement scheme is used in a system in which a training symbol carrying pilots over the entire frequency axis is transmitted at the head, and data symbols uniformly carrying pilots through specific sub-carriers follow the training symbol in a wireless Local Area Network (LAN) where transmission/reception is performed in units of bursts without considering the mobility of a receiver. In this comb-type pilot arrangement, a channel value estimated in the training symbol is usually used in its entirety during a corresponding burst interval, and comb-type pilots are used for frequency tracking.

In contrast, the lattice-type pilot arrangement scheme is used in a broadcasting system where transmission/reception operate continuously, and even reception under a high-speed mobile environment is considered. In this arrangement, pilot sub-carriers are sparsely arranged in a certain pattern on the frequency-time plane, and spacing between the pilot sub-carriers falls within a coherence time and a coherence bandwidth such that interpolation using estimated channel values is possible.

In this manner, an OFDM receiver can constantly estimate and compensate for time-varying channel responses even during mobile reception through the aforementioned comb-type and lattice-type pilot arrangements, and consequently can continue to stably receive data.

Reference will now be made to a two-dimensional interpolation method for estimating a channel value at a pilot sub-carrier from a channel estimate at another pilot sub-carrier, which has been estimated by any algorithm, with reference to the accompanying drawings. The following description will be given by exemplifying a Digital Multimedia Broadcasting-Terrestrial/Handheld (DVB-T/H) system among systems using an OFDM scheme for the convenience of explanation.

Figure 1:
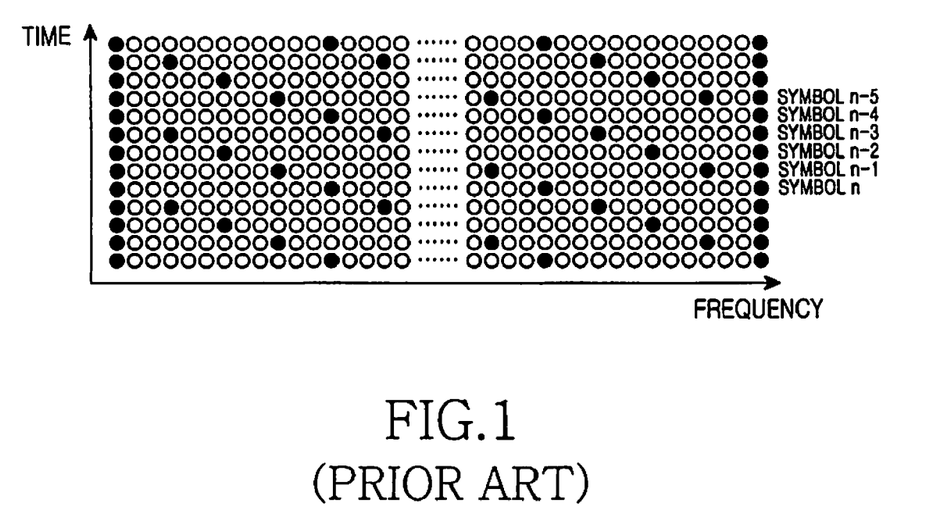
FIG. 1 illustrates a pilot arrangement in a conventional common DVB-T/H system.

FIG. 1 illustrates a pilot arrangement in a conventional DVB-T/H system.

Referring to FIG. 1, the DVB-T/H system uses a combination of the comb-type and lattice-type pilot arrangement schemes. Here, pilots arranged according to the comb-type scheme are referred to as continual pilots, and pilots arranged according to the lattice-type scheme are referred to as scattered pilots. Also, in the pilot arrangement diagram of FIG. 1, the abscissa axis represents the frequency axis, and the ordinate axis represents the time axis.

In the DVB-T/H system in FIG. 1, interpolation is performed from channel values of the pilot sub-carriers arranged according to the lattice-type pilot arrangement scheme. An interpolation method includes a method of performing one-dimensional interpolation for each symbol in the direction of the frequency axis by using only pilot sub-carriers included in the same symbol and a method of performing two-dimensional interpolation at the sacrifice of many symbol delays.

The one-dimensional interpolation method does not cause delays, requires minimal memory capacity, and involves minimal calculations necessary for the interpolation. However, when delay spread is substantial, reception performance may be lowered because spacing between pilot sub-carriers is wide in the direction of the frequency axis. Therefore, the two-dimensional interpolation method is mainly used so as to solve this problem with the one-dimensional interpolation method.

In the conventional two-dimensional interpolation method, in order to minimize the effect of delay spread or Doppler spread, pilot spacing in the time axis is compared with that in the frequency axis, and linear interpolation begins with one axis where pilot spacing is narrower. Through the linear interpolation for the axis where pilot spacing is narrower, known values are obtained at positions between pilots in the other axis where pilot spacing is wider. Thus, since channel estimates at pilot sub-carriers, as well as the known values obtained from the linear interpolation, can be used together for interpolation to be applied to the other axis where pilot spacing is wider, the two-dimensional interpolation method can provide an effect of shortening an interpolation interval as compared to the initial pilot spacing.

Figure 2:
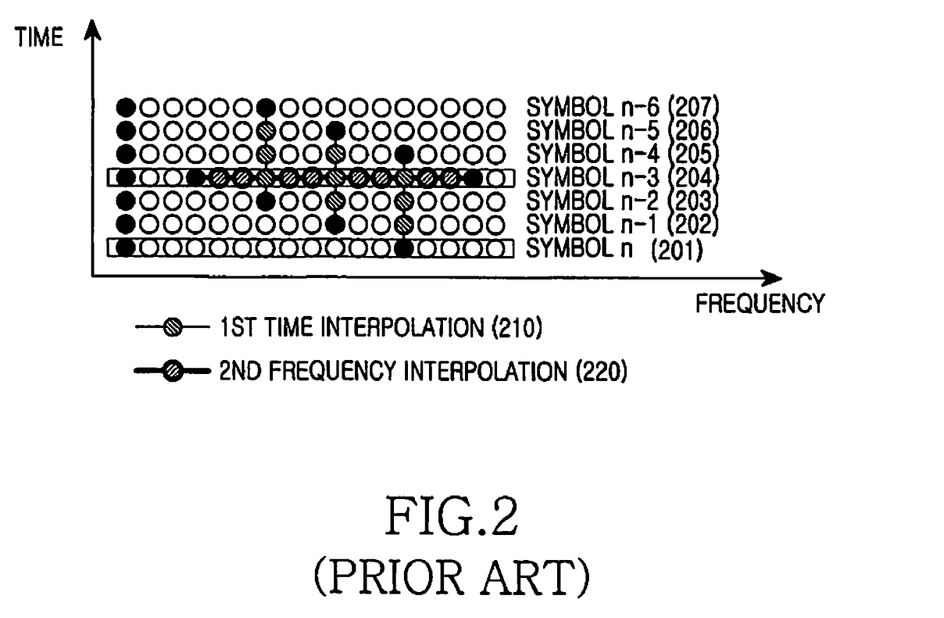
FIG. 2 illustrates a two-dimensional channel interpolation method in a conventional DVB-T/H system.

FIG. 2 illustrates a two-dimensional channel interpolation method in a conventional DVB-T/H system. Here, similar to FIG. 1, the abscissa and ordinate axes represent the frequency and time axes, respectively, and symbol n denotes a currently received symbol. Thus, symbols n−1 to n−6 denote previously received symbols.

Referring to FIG. 2, in the DVB-T/H system, pilot spacing in the time axis is 4 symbols, and pilot spacing in the frequency axis is 12 sub-carriers. Thus, for channel estimates of sub-carriers, interpolation along the time axis with narrow pilot spacing is first performed as a first-time interpolation, with the result that channel estimates designated by circles 210 with left-oblique lines are obtained. If the interpolation along the time axis is repeated in the symbol n, all sub-carrier positions of the symbol n−3, corresponding to multiples of 3, are determined as known values designated by the circles 210 with left-oblique lines. Next, by performing a second-time interpolation along the frequency axis for the symbol n−3, remaining channel estimates designated by circles 220 with right-oblique lines can be calculated.

In the aforementioned conventional two-dimensional interpolation method, since it takes a delay of 3 symbols to obtain channel estimates of one complete symbol and prepare them for use in compensation, a memory capacity that can store all complete Fast Fourier Transform (FFT) outputs of previous 4 symbols including a current symbol is required.

Further, the aforementioned conventional interpolation method has a limitation on ensuring performance in a wireless environment where a terminal moves at high speed. To be specific, although the coherence time of a time-varying fading channel gradually decreases as the moving speed of a receiver increases, the pilot spacing in the time axis is fixed. When a terminal moves at low speed, there may be no problem in performing the time-axis interpolation at intervals of 4 symbols. However, when a terminal moves at high speed, an interpolation interval between symbols becomes larger than a coherence time, which causes interpolation errors. Further, the frequency-axis interpolation is subsequently performed using inaccurate intermediate values including the interpolation errors, and thus interpolation for remaining sub-carriers also results in non-reliable values. In the end, a problem of deterioration of the overall reception performance is caused.

SUMMARY OF THE INVENTION

Accordingly, the present invention has been made to solve at least the above-mentioned problems occurring in the prior art, and the present invention provides a channel estimation method and apparatus, which can minimize performance deterioration and enhance reception performance at high speed in an OFDM system.

Further, the present invention provides a channel estimation method and apparatus, which can reduce the size of a memory in an OFDM system.

In accordance with the present invention, there is provided a channel estimation method using pilots in an OFDM system, including performing channel estimation at a pilot position of a received symbol, thereby calculating a first channel estimate, performing interpolation in a diagonal direction between the first channel estimate and a channel estimate for another pilot position that is different from that of the first channel estimate when viewed in directions of time and frequency axes, thereby calculating a second channel estimate for a data position, performing interpolation in the direction of the time axis between the second channel estimate and a channel estimate for another pilot position that is identical to that of the second channel estimate when viewed in the direction of the time axis, thereby calculating a third channel estimate for another data position, and performing interpolation in the direction of the frequency axis by using the channel estimates for the pilot positions and the second and third channel estimates, thereby calculating channel estimates for remaining data positions.

In accordance with the present invention, there is provided a channel estimation apparatus using pilots in an OFDM system, including a pilot channel estimator for calculating channel estimates by performing channel estimation at pilot positions of a received symbol, a two-dimensional interpolator for performing interpolation in a diagonal direction between a first channel estimate and a channel estimate for another pilot position that is different from that of the first channel estimate when viewed from directions of time and frequency axes, among the channel estimates, thereby calculating a second channel estimate for a data position, and performing interpolation in the direction of the time axis between the second channel estimate and a channel estimate for another pilot position that is identical to that of the second channel estimate when viewed in the direction of the time axis, among the channel estimates, thereby calculating a third channel estimate for another data position, a one-dimensional interpolator for performing interpolation in the direction of the frequency axis by using the channel estimates and the second and third channel estimates, thereby calculating channel estimates for remaining data positions, an output buffer for storing the received symbol, and a channel estimation buffer for storing the first and second channel estimates.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description, the same elements will be designated by the same reference numerals although they are shown in different drawings. Further, in the following description, only parts necessary for understanding operations of the present invention will described, and a detailed description of known functions and configurations incorporated herein will be omitted for the sake of clarity and conciseness.

The present invention discloses a channel estimation method and apparatus capable of enhancing reception performance even in a high-speed environment, and particularly a method and apparatus for performing two-dimensional interpolation of channel estimates for pilot sub-carriers arranged in a certain pattern on the frequency-time plane, thereby estimating channel values for remaining data sub-carriers. In the present invention, it should be noted that since an interpolation method using channel estimation information, that is, an algorithm related to channel estimation for pilot sub-carriers, will not be discussed in detail because it is outside of the object of the present invention.

Figure 3:
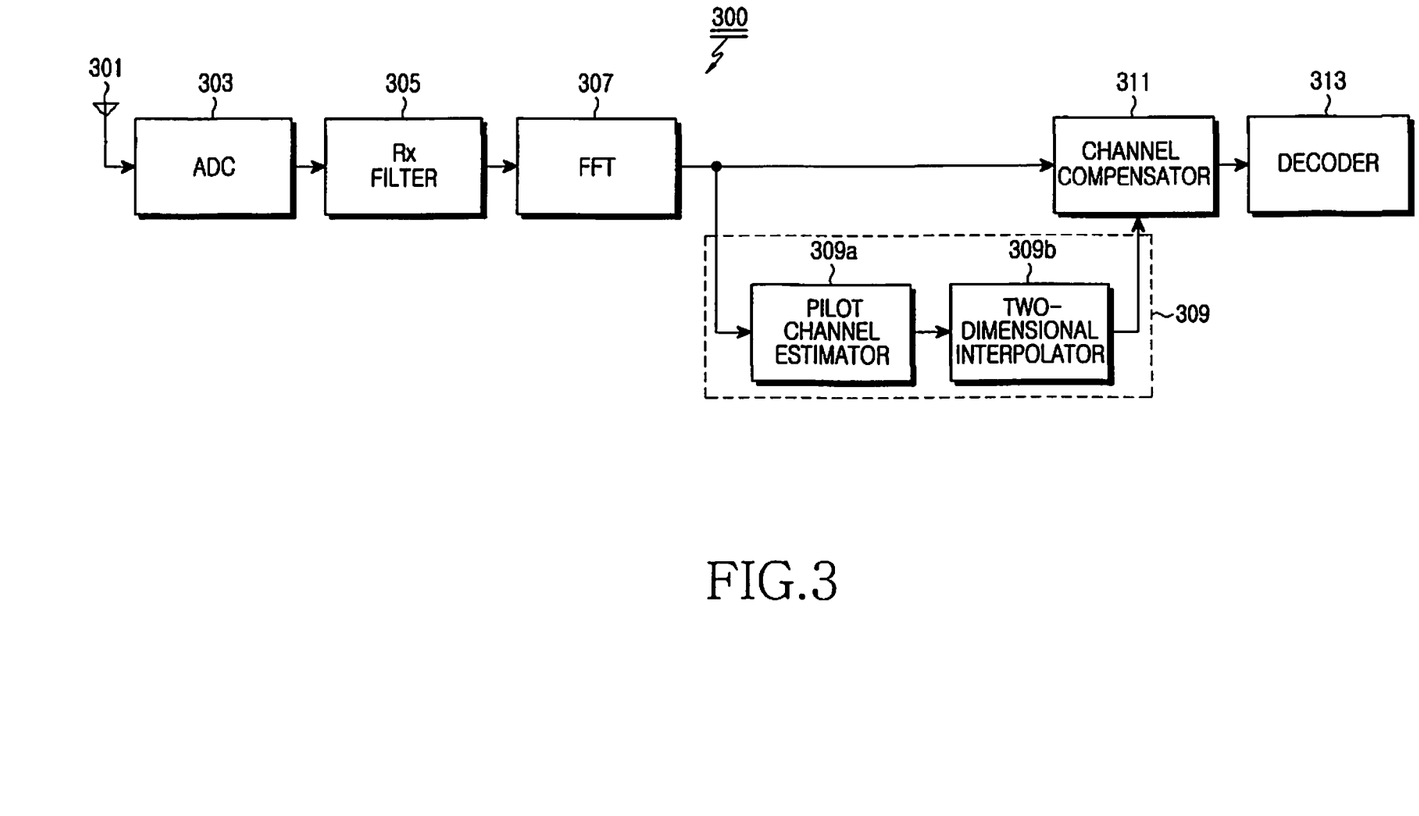
FIG. 3 illustrates a structure of a receiver that includes a channel estimation apparatus in an OFDM system according to the present invention.

FIG. 3 illustrates a receiver including a channel estimation apparatus in an OFDM system according to the present invention.

Referring to FIG. 3, the channel estimation apparatus 300 includes common constituent elements, such as an Analog-to-Digital Converter (ADC) 303 for converting an analog signal received through an antenna 301 into a digital signal, a Receive (Rx) filter 305 for extracting and filtering only a signal of a service band from the received signal, and a Fast Fourier Transformer (FFT) 307 for transforming the time-domain received signal into a frequency-domain signal.

The channel estimation apparatus 300 further includes a pilot channel estimator 309a for estimating a channel (i.e., pilot channel) corresponding to each pilot of the converted received signal, a two-dimensional interpolator 309b for performing linear interpolation to be described below (hereinafter diagonal interpolation), which allows for simultaneous interpolation in the time and frequency axes, so as to estimate a channel corresponding to each data by using information on the estimated pilot channel according to the present invention, a channel compensator 311 for compensating for a signal of the estimated channel, and a decoder 313 for decoding the signal of the compensated channel into an original signal. Here, the pilot channel estimator 309a and the two-dimensional interpolator 309b constitute a channel estimator unit 309, and the two-dimensional interpolator 309b is provided with a memory (not shown) for an estimated channel value and a channel value interpolated through the estimated channel value.

Figure 4:
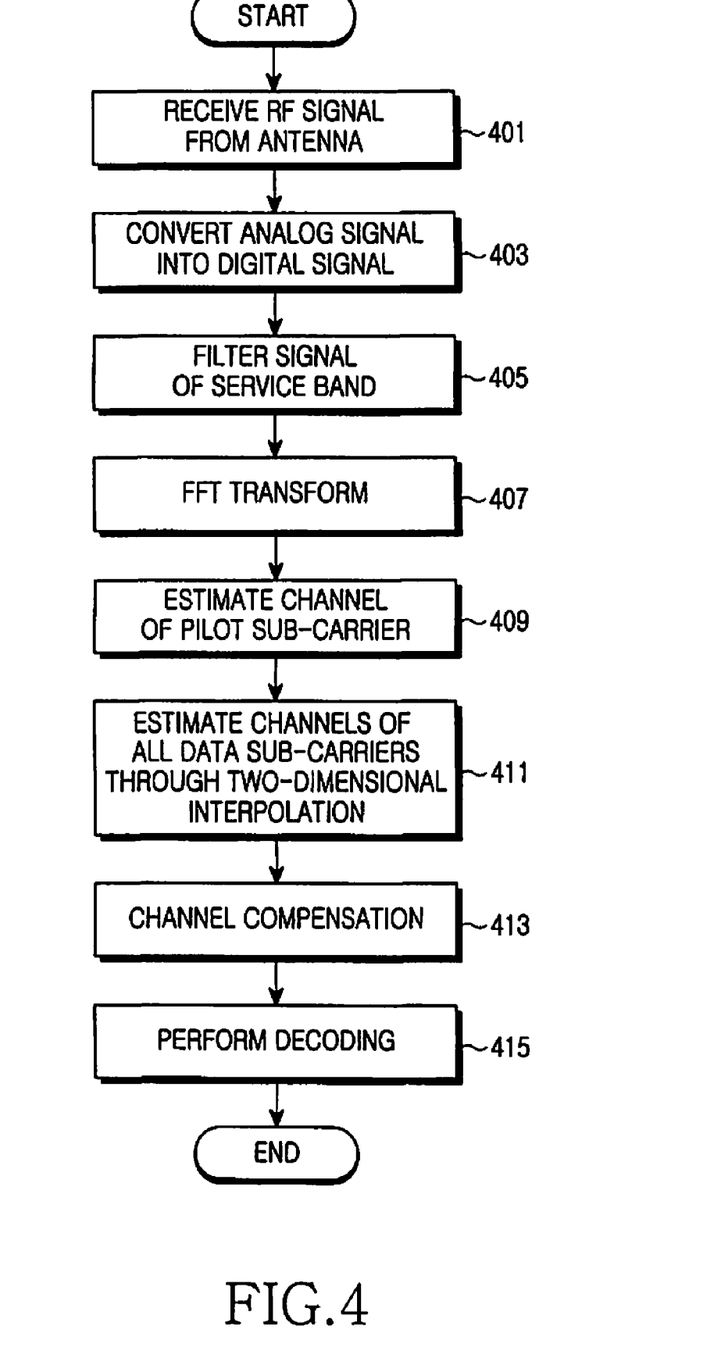
FIG. 4 illustrates a method for performing channel estimation in an OFDM system according to the present invention.

FIG. 4 illustrates a channel estimation method in an OFDM system according to the present invention, and corresponds to a flowchart illustrating operations in the channel estimation apparatus of FIG. 3.

First, in step 401, the channel estimation apparatus 300 of FIG. 3 receives an analog Radio Frequency (RF) signal from the antenna 301. Subsequently, in step 403, the ADC quantizes the received analog signal into a digital signal, and transmits the digital signal to the Rx filter 305. In step 405, the Rx filter 305 filters the quantized signal. The filtered signal is serial-to-parallel converted, and then input into the FFT converter 307. In step 407, the FFT 307 converts the time-domain signal, transmitted from the Rx filter 305, into a frequency-domain signal, and outputs the frequency-domain signal to the pilot channel estimator 309a and the channel compensator 311.

In step 409, the pilot channel estimator 309a estimates a channel value at a pilot sub-carrier position by using demodulation data of a sub-carrier corresponding to a pilot among the outputs from the FFT 307. Subsequently, in step 411, the two-dimensional interpolator 309b performs two-dimensional interpolation to thereby calculate channel values at remaining data sub-carriers. Here, the two-dimensional interpolator 309b performs the two-dimensional interpolation by using a diagonal interpolation method according to the present invention. The diagonal interpolation method will be described below in detail.

Subsequently, in step 413, the channel compensator 311 equalizes the received signal by using the estimated channel values over the whole sub-carrier. In step 415, the decoder 313 receives the channel-compensated signal, and performs a decoding operation.

Reference will now be made in detail to a diagonal interpolation method according to the present invention, as described above in step 413 of FIG. 4, with reference to the accompanying drawings.

The present invention generally shortens an interpolation interval in the direction of the time axis in such a manner that known values are obtained between pilot sub-carriers arranged at intervals of 4 symbols by performing preceding diagonal interpolation between channel estimates at the pilot sub-carriers, and channel estimates between the obtained known values and the existing pilot sub-carriers are calculated again by performing interpolation in the direction of the time axis.

Figure 5:
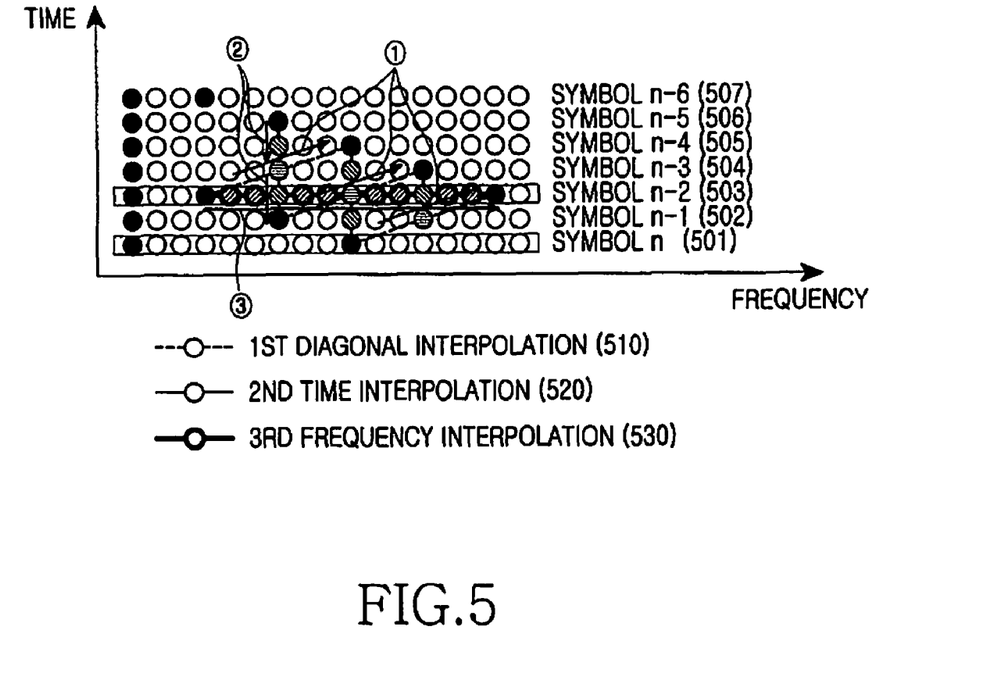
FIG. 5 illustrates a diagonal interpolation method according to the present invention.

FIG. 5 illustrates a diagonal interpolation method according to the present invention.

Referring to FIG. 5, it is first assumed that a currently received symbol is symbol n 501, and a channel estimate for the kth pilot sub-carrier capable of direct channel estimation is defined as $H_{n,k}$. If $H_{n,k}$ is obtained, interpolation in direction ⓐ is first performed. That is, a channel estimate $H_{n-1,k+3}$ at a mid-point between the kth pilot sub-carrier and the (k+6)th pilot sub-carrier can be obtained through interpolation between $H_{n,k}$ and a channel estimate $H_{n-2,k+6}$ that is obtained at the (k+6)th pilot sub-carrier of symbol n-2 preceding by 2 symbols.

Once diagonal interpolation (i.e., interpolation in direction ⓐ) is performed for all pilot sub-carriers on the frequency-time plane, known values 510 arranged at intervals of 2 symbols are obtained for all sub-carriers corresponding to multiples of 3. Next, channel values 520 between the known values 510 arranged at intervals of 2 symbols are calculated through interpolation in the direction of the time axis, that is, in direction ⓐ. By performing up to this step, all channel estimates for the sub-carriers corresponding to multiples of 3 can be known, and channel estimates for remaining sub-carriers that are not multiples of 3 are finally obtained through interpolation in the direction of the frequency axis, that is, in direction ⓐ.

Figure 6:
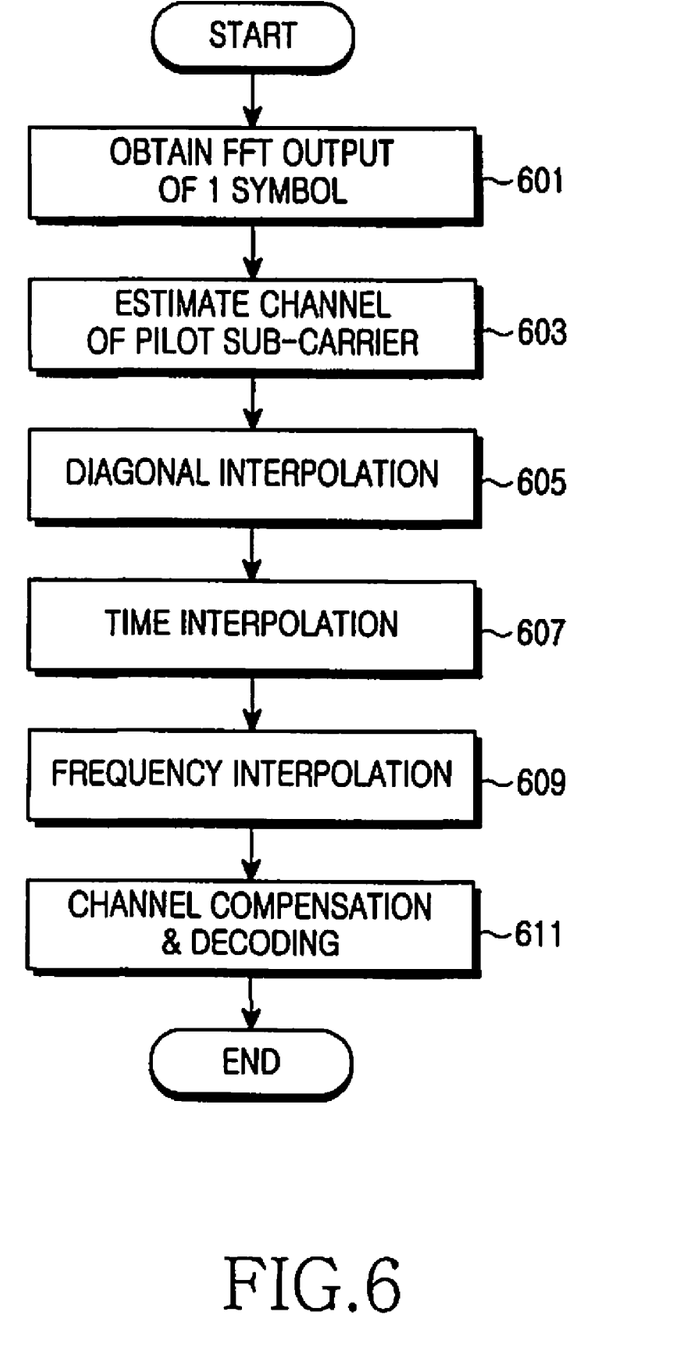
FIG. 6 illustrates a channel estimation method according to the present invention.

FIG. 6 illustrates a channel estimation method according to the present invention.

Referring to FIG. 6, the pilot channel estimator 309a inputs therein an FFT output of 1 symbol, output from the FFT 307, in step 601, and estimates channels of pilot sub-carriers in step 603. Subsequently, in steps 605 to 609, the two-dimensional interpolator 309b performs interpolation in each of the diagonal direction, and the time axis and the frequency axis directions, as described above. In step 611, the channel compensator 311 and the decoder 313 perform channel compensation and decoding by using the interpolated values.

Figure 7:
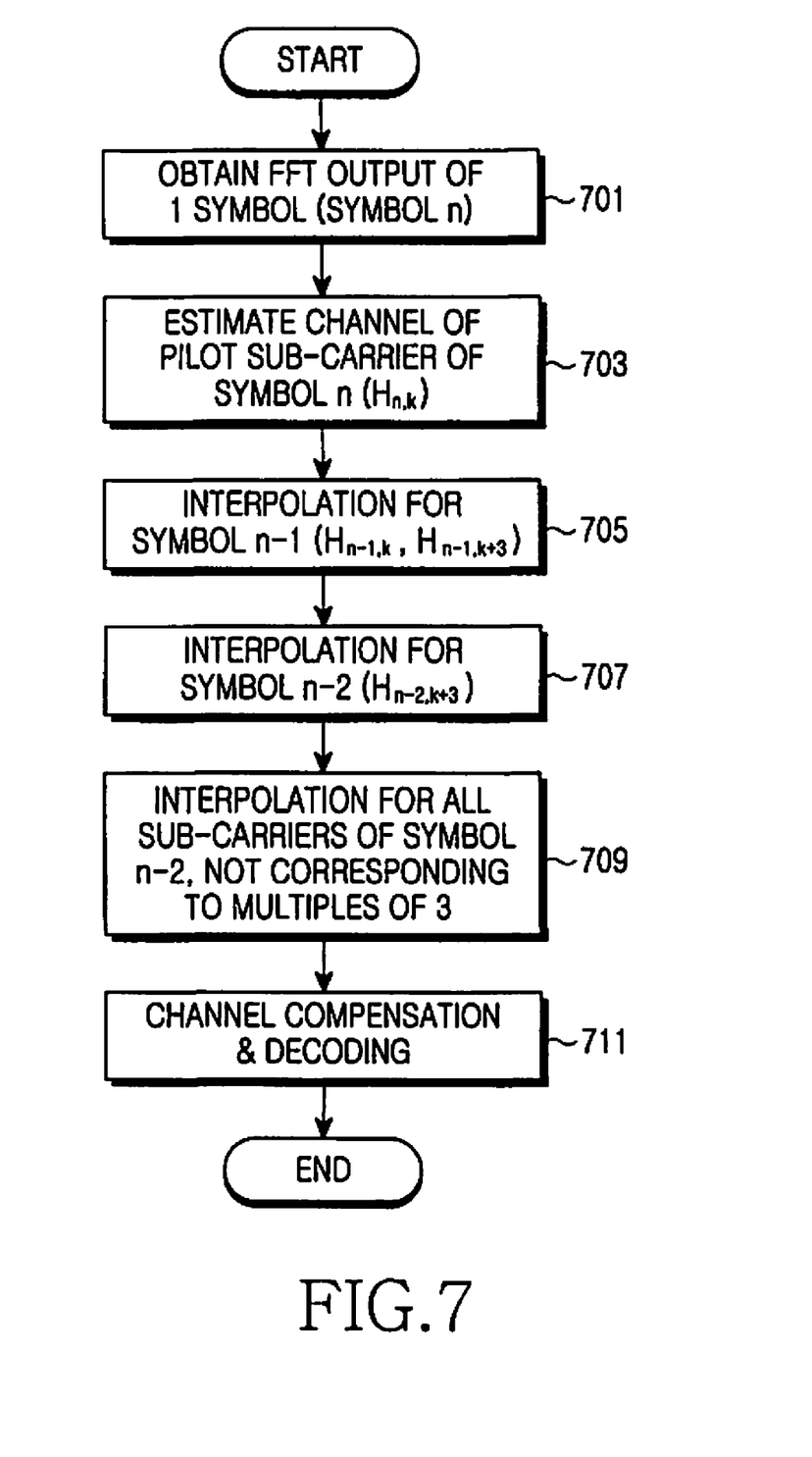
FIG. 7 illustrates in detail a channel estimation method according to the present invention.

FIG. 7 illustrates a channel estimation method, and particularly a detail of an interpolation method according to the present invention.

Referring to FIG. 7, in step 701, the pilot channel estimator 309a of the channel estimator unit 309 receives an output of 1 symbol from the FFT 307. The FFT 307 outputs data in units of symbols. Also, let symbol n be a currently received symbol, and let k be a sub-carrier index for indicating any pilot sub-carrier in the symbol n.

On receiving the symbol n from the FFT 307, in step 703, the pilot channel estimator 309a estimates a channel value $H_{n,k}$ at pilot sub-carrier k of the currently received symbol n, and stores the estimated channel value in a channel estimation buffer. Subsequently, in step 705, the two-dimensional interpolator 309b calculates channel values $H_{n-1,k}$ and $H_{n-1,k+3}$ of symbol n-1 through interpolation as given in the following Equation (1), and stores the calculated channel values in the channel estimation buffer, where $H_{n-1,k}$ is calculated through interpolation in the direction of time axis, and $H_{n-1,k+3}$ is calculated through interpolation in the diagonal direction. In Equation (1), $$H_{n-1,k}=(H_{n,k}+H_{n-2,k})/2 \text{ time interpolation}$$

$$H_{n-1,k+3}=(H_{n,k}+H_{n-2,k+6})/2 \text{ diagonal interpolation} \quad (1)$$

On completing the interpolation for the symbol n-1, in step 707, the pilot channel estimator 309a performs interpolation for symbol n-2 by using the following Equation (2):

$$H_{n-1,k}=(H_{n,k}+H_{n-2,k})/2 \text{ time interpolation} \quad (2)$$

In step 705, $H_{n,k}$ is obtained by performing step 403, and $H_{n-2,k}$ corresponds to a value resulting from performing step 705 for a previous symbol, which is stored in the channel estimation buffer. Similarly, $H_{n-2,k+6}$ corresponds to a value resulting from performing step 703 for a previous symbol preceding by 2 symbols, which is stored in the channel estimation buffer. $H_{n-1,k+3}$ used in step 707 is obtained from a result of performing step 705, and $H_{n-3,k+3}$ corresponds to a value resulting from performing step 703 for a previous symbol preceding by 3 symbols, which is stored in the channel estimation buffer.

Here, steps 703 to 707 are repeatedly performed for all the kth pilot sub-carriers of the symbol n.

In addition, channel estimates at the first and last sub-carriers must be calculated. However, since continual pilots according to the comb-type pilot arrangement are positioned at the first and last sub-carriers in the DVB-T/H system, an output of the pilot channel estimator is stored intact in the channel estimation buffer for each symbol. In an OFDM system without continual pilots at both ends, channel estimates in the latest symbol where the first and last sub-carriers are used as pilot sub-carriers may be copied and used in their entirety, or may be interpolated in the direction of the time axis and stored in the buffer for use in later symbols.

If the process of repeatedly performing steps 703 to 707 is completed, channel estimates for all sub-carrier positions of the symbol n−2, corresponding to multiples of 3, are stored in the channel estimation buffer. Subsequently, in step 709, the pilot channel estimator 309a reads out the stored channel estimates for the sub-carrier positions of the symbol n−2, corresponding to multiples of 3, and performs interpolation in the direction of frequency axis to thereby calculate channel estimates for all sub-carrier positions of the symbol n−2.

In step 711, the channel compensator 311 performs channel compensation for FFT outputs of the symbol n−2, stored in a separate FFT output buffer, by using the calculated channel estimates of the symbol n−2, and the decoder 313 performs decoding for the compensated FFT outputs.

Figure 8:
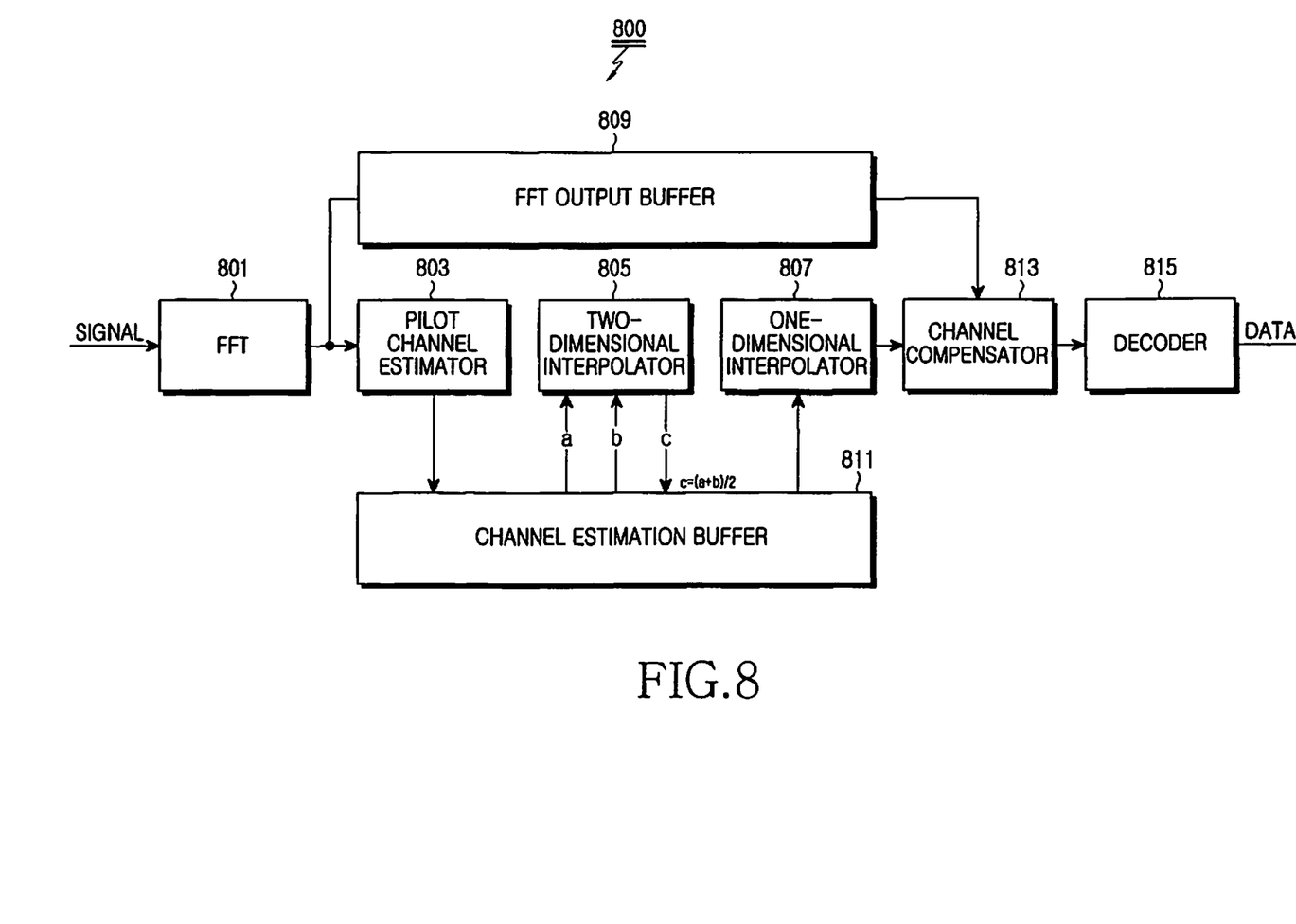
FIG. 8 illustrates a structure of a channel estimation apparatus according to the present invention.

FIG. 8 illustrates a channel estimation apparatus 800 according to the present invention.

Referring to FIG. 8, the channel estimation apparatus 800 includes an FFT 801, a pilot channel estimator 803, a two-dimensional interpolator 805, a one-dimensional interpolator 807, a channel compensator 813, an FFT output buffer 809, a channel estimation buffer 811 and a decoder 815. Here, the following description will focus on the constructions according to the present invention.

On receiving symbol n from the FFT 801, the pilot channel estimator 803 estimates a channel value $H_{n,k}$ at pilot sub-carrier k, and stores the channel estimate in the channel estimation buffer 811, as in step 703 of FIG. 7.

The two-dimensional interpolator 805 receives stored estimates or interpolated values a and b from the channel estimation buffer 811, performs diagonal interpolation and interpolation in the direction of the time axis to thereby calculate c=(a+b)/2, and then stores the calculated value in the channel estimation buffer 811 again. Here, c is the calculated value briefly representing a result of Equation (1).

The one-dimensional interpolator 807 reads out channel estimates for pilot sub-carrier positions of symbol n−2, corresponding to multiples of 3, which are calculated through the diagonal interpolation and the interpolation in the direction of the time axis, and then performs interpolation in the direction of the frequency axis for them to thereby calculate channel estimates for all sub-carrier positions of the symbol n−2.

The channel compensator 813 performs channel compensation for the symbol n−2, stored in the FFT output buffer 809, by using all the channel estimates of the symbol n−2, calculated by the one-dimensional interpolator 807. The decoder 815 performs decoding for the compensated symbol n−2.

The FFT output buffer 809 is implemented by a buffer that can store all sub-carriers of 3 symbols including a current symbol.

The channel estimation buffer 811 must be implemented by a buffer capable of storing channel estimates, the amount of which corresponds to 3 symbols, in order to perform two-dimensional interpolation. Although the channel estimation buffer 811 according to the present invention seems to require a storage capacity of 4 symbols including a current symbol, it can operate with a storage capacity of 3 symbols because a storage space for sub-carriers used in the symbol n does not overlap with that for the symbol n−3. Also, since the channel estimation buffer 811 stores only channel estimates for sub-carrier positions corresponding to multiples of 3, and allocates only sub-carriers corresponding to one-third of the total number of sub-carriers to each symbol, it only has to be actually provided with a buffer with a size of (3 symbols×total sub-carriers/3).

The channel estimation method according to the present invention significantly improves reception performance in a high-speed environment, as compared to the conventional channel estimation method.

While the interpolation interval in the direction of the time axis is a maximum of 4 symbols in the conventional channel estimation method illustrated in FIG. 2, the interpolation interval in the diagonal direction or in the direction of the time axis is only 2 symbols in the channel estimation method according to the present invention. Since the interpolation interval in the direction of the time axis is reduced to ½, interpolation errors decrease, and the reliability of channel estimation is enhanced, so that the inventive method can obtain stable reception performance even in a high-speed environment, as compared to the conventional method.

In addition to an improvement in reception performance, an effect of a decrease in necessary memory capacity and delay time can also be obtained. In the conventional method, a delay of 3 symbols is required for obtaining completed channel estimates of 1 symbol. In contrast, only a delay of 2 symbols is required in the improved method according to the present invention. Although the conventional method requires a buffer capable of storing past FFT outputs corresponding to 4 symbols including a current symbol, buffer size is reduced to that corresponding to 3 symbols in the improved method according to the present invention because delay time decreases.

Figure 9:
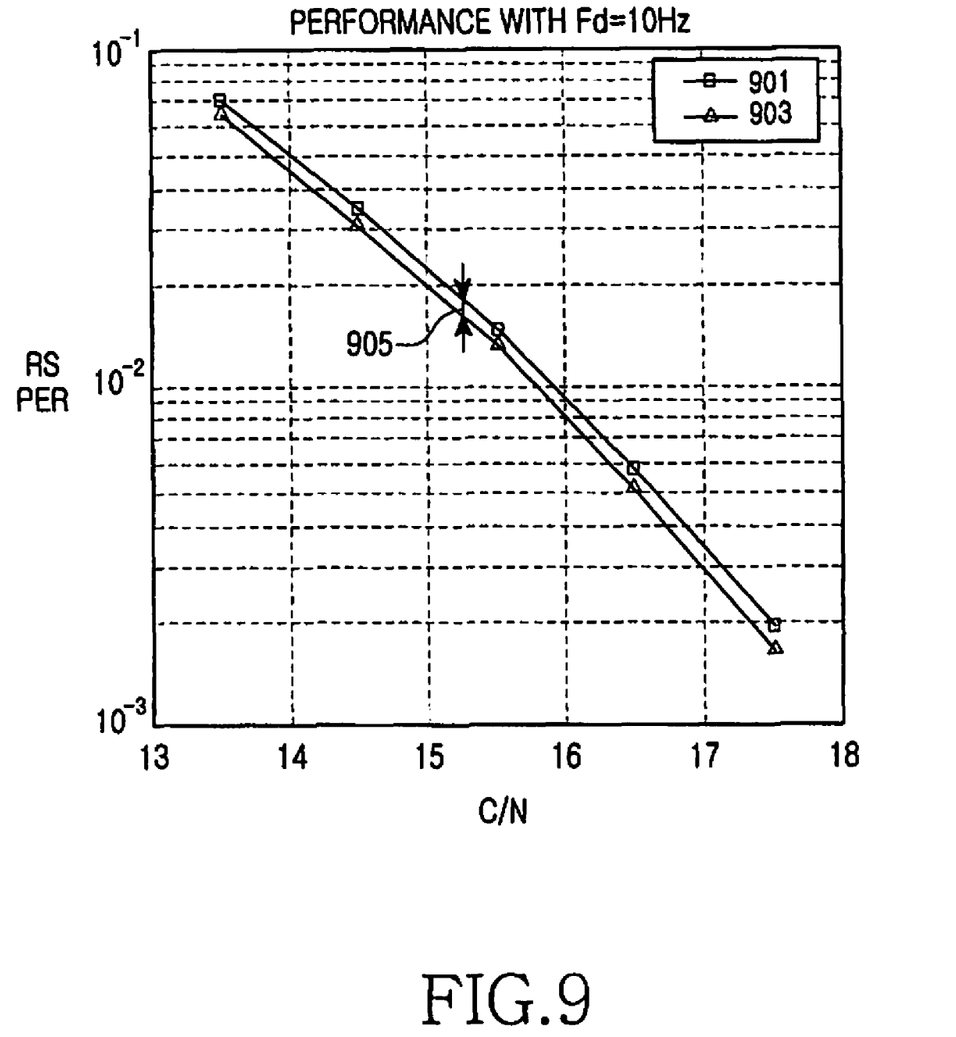
FIGS. 9 and 10 illustrate reception performance test results of an OFDM receiver to which a channel estimation method according to the present invention is applied.
Figure 10:
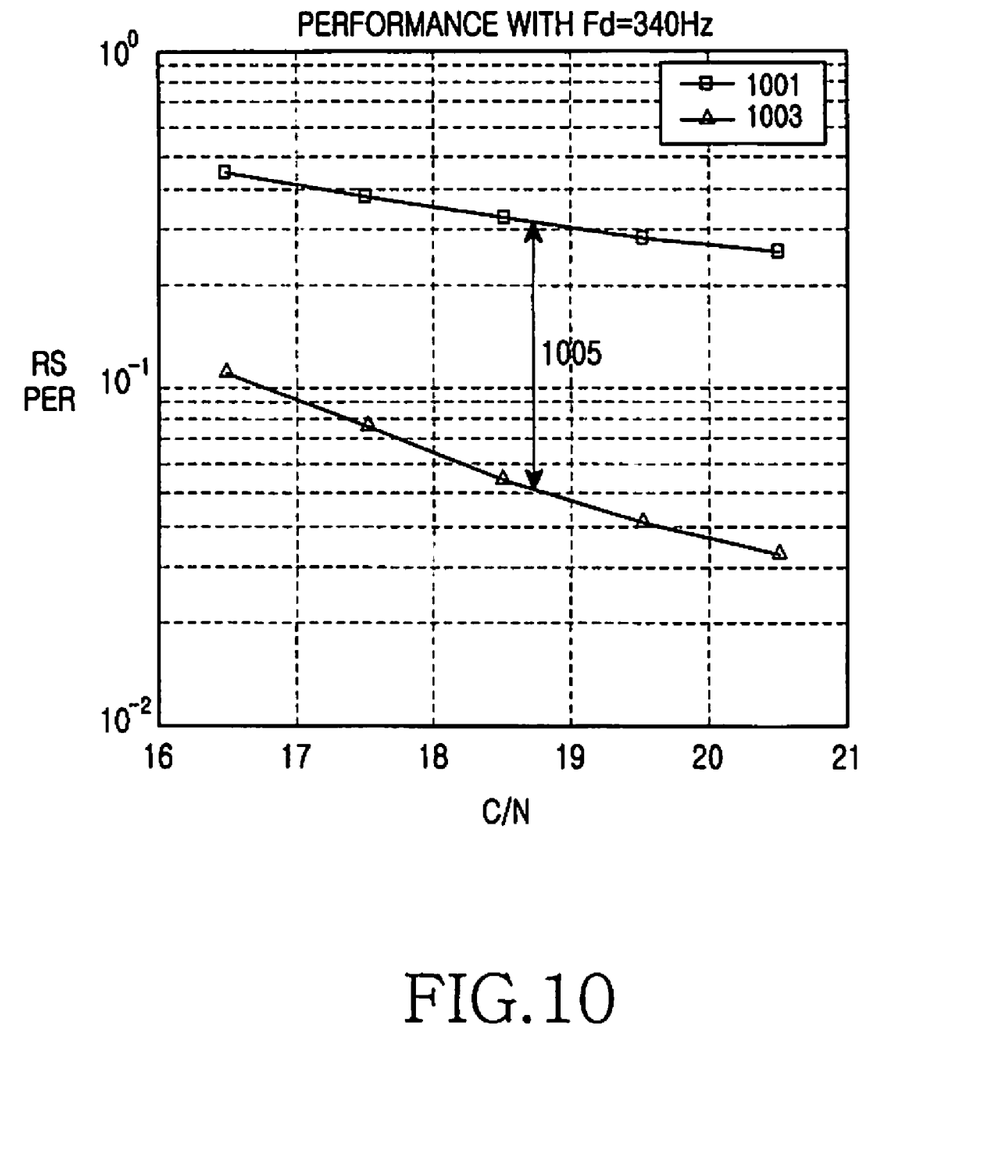

FIGS. 9 and 10 illustrate reception performance test results in a DVB-T/H system to which a channel estimation method according to the present invention is applied, and represent test results in a low-speed environment with a maximum Doppler frequency of 10 Hz and in a high-speed environment with a maximum Doppler frequency of 340 Hz, respectively.

Channel TU6 (Typical Urban of 6 path) is supposed in the reception performance tests, an FFT size of 2K mode, a guard interval of ¼, a modulation method of 16QAM and a code rate of ½ are used as test conditions, and a native interleaver is used as an interleaver.

In FIGS. 9 and 10, the abscissa axis represents a Carrier to Noise ratio (C/N), and the ordinate axis represents the Packet Error Rate (PER) of a Reed Solomon (RS) decoder.

In FIG. 9, when comparing the inventive channel estimation method 903 with the conventional channel estimation method 901, it can be noted that the receiver to which the inventive channel estimation method 903 is applied has the overall reception performance improved by S1 905 corresponding to a difference between the two error curves 901 and 903, as compared to the conventional channel estimation method. It can be noted from FIG. 10 that such a difference in reception performance increases as the receiver increases in speed, as seen from S2 1005, and thus reception performance in the inventive channel estimation method is more improved at higher speed. When comparing high-speed reception performance in the inventive method with that in the conventional method, the slope of the error curve itself is significantly changed, thus resulting in a significant improvement in reception performance.

As described above, according to the present invention, an interpolation interval in the direction of the time axis is reduced to ½ of that in the conventional method by performing diagonal interpolation, so that not only reception performance can be enhanced due to a decrease in interpolation errors, but also the memory capacity required for a receiver and delay time can be reduced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A channel estimation method using pilots in an Orthogonal Frequency Division Multiplexing (OFDM) system, the channel estimation method comprising:
   receiving a symbol at an OFDM receiver;
   performing a first channel estimation at a pilot position of the received symbol, thereby calculating a first channel estimate;
   performing interpolation in a diagonal direction exclusively between the first channel estimate and a channel estimate for another pilot position that is different from the pilot position of the first channel estimate when viewed in directions of time and frequency axes, thereby calculating a second channel estimate for a data position, wherein the data position of the second channel estimate differs from both the pilot position of the first channel estimate, and the another pilot position, when viewed in directions of time and frequency axes;
   performing interpolation in the direction of the time axis between the second channel estimate and a channel estimate for another pilot position that is identical to the pilot position of the second channel estimate when viewed in the direction of the time axis, thereby calculating a third channel estimate for another data position; and
   performing interpolation in the direction of the frequency axis by using the channel estimates for the pilot positions and the second and third channel estimates, thereby calculating channel estimates for remaining data positions.

2. The channel estimation method as claimed in claim 1, wherein the second channel estimate is calculated by a following equation, $$H_{n-1,k+3}=(H_{n,k}+H_{n-2,k+6})/2$$

where, n denotes an index of the received symbol, k denotes a sub-carrier index for the pilot position of the received symbol, and H denotes a channel estimate.

3. The channel estimation method as claimed in claim 2, wherein the third channel estimate is calculated by a following equation, $$H_{n-2,k+3}=(H_{n-1,k+3}+H_{n-3,k+3})/2.$$

4. The channel estimation method as claimed in claim 1, wherein the OFDM system includes at least one of a Digital Multimedia Broadcasting-Terrestrial (DVB-T) system and a Digital Multimedia Broadcasting-Handheld (DVB-H) system.

5. The channel estimation method as claimed in claim 1, wherein the pilot position is determined on a frequency-time plane by at least one of a comb-type pilot arrangement scheme and a lattice-type pilot arrangement scheme.

6. A channel estimation apparatus using pilots in an Orthogonal Frequency Division Multiplexing (OFDM) system, the channel estimation apparatus comprising:
   a pilot channel estimator for calculating channel estimates by performing channel estimation at pilot positions of a received symbol;
   a two-dimensional interpolator for performing interpolation in a diagonal direction exclusively between a first channel estimate and a channel estimate for another pilot position that is different from the pilot position of the first channel estimate when viewed from directions of time and frequency axes, among the channel estimates, thereby calculating a second channel estimate for a data position, and performing interpolation in the direction of the time axis between the second channel estimate and a channel estimate for another pilot position that is identical to the pilot position of the second channel estimate when viewed in the direction of the time axis, among the channel estimates, thereby calculating a third channel estimate for another data position;
   a one-dimensional interpolator for performing interpolation in the direction of the frequency axis by using the channel estimates and the second and third channel estimates, thereby calculating channel estimates for remaining data positions;
   an output buffer for storing the received symbol; and
   a channel estimation buffer for storing the first and second channel estimates.

7. The channel estimation apparatus as claimed in claim 6, wherein the second channel estimate is calculated by a following equation, $$H_{n-1,k+3}=(H_{n,k}+H_{n-2,k+6})/2$$

where, n denotes an index of the received symbol, k denotes a sub-carrier index for the pilot position of the received symbol, and H denotes a channel estimate.

8. The channel estimation apparatus as claimed in claim 7, wherein the third channel estimate is calculated in a following equation, $$H_{n-2,k+3}=(H_{n-1,k+3}+H_{n-3,k+3})/2.$$

9. The channel estimation apparatus as claimed in claim 6, wherein the output buffer stores at least 3 symbols including all sub-carriers.

10. The channel estimation apparatus as claimed in claim 6, wherein the channel estimation buffer stores at least 3 symbols including ⅓ of all sub-carriers.

11. The channel estimation apparatus as claimed in claim 6, wherein the OFDM system includes at least one of a Digital Multimedia Broadcasting-Terrestrial (DVB-T) system and a Digital Multimedia Broadcasting-Handheld (DVB-H) system.

12. The channel estimation apparatus as claimed in claim 6, wherein the pilot position is determined on a frequency-time plane by at least one of a comb-type pilot arrangement scheme and a lattice-type pilot arrangement scheme.

13. A channel estimation apparatus using pilots in an Orthogonal Frequency Division Multiplexing (OFDM) system, the channel estimation apparatus comprising:
- means for calculating channel estimates by performing channel estimation at pilot positions of a received symbol;
- means for performing interpolation in a diagonal direction between a first channel estimate and a channel estimate for another pilot position that is different from the pilot position of the first channel estimate when viewed from directions of time and frequency axes, among the channel estimates, thereby calculating a second channel estimate for a data position, wherein the data position of the second channel estimate differs from both the pilot position of the first channel estimate, and the another pilot position, when viewed from directions of time and frequency axes;
- means for performing interpolation in the direction of the time axis between the second channel estimate and a channel estimate for another pilot position that is identical to the pilot position of the second channel estimate when viewed in the direction of the time axis, among the channel estimates, thereby calculating a third channel estimate for another data position;
- means for performing interpolation in the direction of the frequency axis by using the channel estimates and the second and third channel estimates, thereby calculating channel estimates for remaining data positions;
- means for storing the received symbol; and
- means for storing the first and second channel estimates.

14. The channel estimation apparatus as claimed in claim 13, wherein the second channel estimate is calculated by a following equation, $$H_{n-1,k+3}=(H_{n,k}+H_{n-2,k+6})/2$$

where, n denotes an index of the received symbol, k denotes a sub-carrier index for the pilot position of the received symbol, and H denotes a channel estimate.

15. The channel estimation apparatus as claimed in claim 14, wherein the third channel estimate is calculated in a following equation, $$H_{n-2,k+3}=(H_{n-1,k+3}+H_{n-3,k+3})/2.$$

16. The channel estimation apparatus as claimed in claim 13, wherein the means for storing the received symbols stores at least 3 symbols including all sub-carriers.

17. The channel estimation apparatus as claimed in claim 13, wherein the means for storing the first and second channel estimates stores at least 3 symbols including ⅓ of all sub-carriers.

18. The channel estimation apparatus as claimed in claim 13, wherein the OFDM system includes at least one of a Digital Multimedia Broadcasting-Terrestrial (DVB-T) system and a Digital Multimedia Broadcasting-Handheld (DVB-H) system.

19. The channel estimation apparatus as claimed in claim 13, further comprising means for determining a pilot position on a frequency-time plane by at least one of a comb-type pilot arrangement scheme and a lattice-type pilot arrangement scheme.

20. A computer program product stored on a tangible non-transitory computer readable medium for performing channel estimation using pilots in an Orthogonal Frequency Division Multiplexing (OFDM) system, the computer program product comprising:
- a non-transitory processor-readable storage medium having instructions stored thereon, the instructions comprising:
  - at least one instruction for calculating channel estimates by performing channel estimation at pilot positions of a received symbol;
  - at least one instruction for performing interpolation in a diagonal direction exclusively between a first channel estimate and a channel estimate for another pilot position that is different from the pilot position of the first channel estimate when viewed from directions of time and frequency axes, among the channel estimates, thereby calculating a second channel estimate for a data position, and performing interpolation in the direction of the time axis between the second channel estimate and a channel estimate for another pilot position that is identical to the pilot position of the second channel estimate when viewed in the direction of the time axis, among the channel estimates, thereby calculating a third channel estimate for another data position;
  - at least one instruction for performing interpolation in the direction of the frequency axis by using the channel estimates and the second and third channel estimates, thereby calculating channel estimates for remaining data positions;
  - at least one instruction for storing the received symbol; and
  - at least one instruction for storing the first and second channel estimates.

21. The computer program product as claimed in claim 20, wherein the second channel estimate is calculated by a following equation, $$H_{n-1,k+3}=(H_{n,k}+H_{n-2,k+6})/2$$

where, n denotes an index of the received symbol, k denotes a sub-carrier index for the pilot position of the received symbol, and H denotes a channel estimate.

22. The computer program product as claimed in claim 21, wherein the third channel estimate is calculated in a following equation, $$H_{n-2,k+3}=(H_{n-1,k+3}+H_{n-3,k+3})/2.$$

23. The computer program product as claimed in claim 20, wherein the at least one instruction for storing the received symbols comprises at least one instruction for storing at least 3 symbols including all sub-carriers.

24. The computer program product as claimed in claim 20, wherein the at least one instruction for storing the first and second channel estimates comprises at least one instruction for storing at least 3 symbols including ⅓ of all sub-carriers.

25. The computer program product as claimed in claim 20, wherein the OFDM system includes at least one of a Digital Multimedia Broadcasting-Terrestrial (DVB-T) system and a Digital Multimedia Broadcasting-Handheld (DVB-H) system.

26. The computer program product as claimed in claim 20, further comprising at least one instruction for determining a pilot position on a frequency-time plane by at least one of a comb-type pilot arrangement scheme and a lattice-type pilot arrangement scheme.

* * * * *